United States Patent
Buil et al.

(10) Patent No.: US 11,368,811 B2
(45) Date of Patent: Jun. 21, 2022

(54) SYSTEM AND METHOD FOR REGISTERING A POSITION OF LOSS OF AN OBJECT

(71) Applicant: KONINKLIJKE PHILIPS N.V., Eindhoven (NL)

(72) Inventors: Vincentius Paulus Buil, Veldhoven (NL); Lucas Jacobus Franciscus Geurts, Best (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 331 days.

(21) Appl. No.: 16/631,917

(22) PCT Filed: Jul. 23, 2018

(86) PCT No.: PCT/EP2018/069926
§ 371 (c)(1),
(2) Date: Jan. 17, 2020

(87) PCT Pub. No.: WO2019/020568
PCT Pub. Date: Jan. 31, 2019

(65) Prior Publication Data
US 2020/0178029 A1    Jun. 4, 2020

(30) Foreign Application Priority Data

Jul. 24, 2017  (EP) .................................... 17182809

(51) Int. Cl.
*G08B 26/00* (2006.01)
*H04W 4/024* (2018.01)
(Continued)

(52) U.S. Cl.
CPC ............ *H04W 4/024* (2018.02); *G08B 21/24* (2013.01); *H04W 52/0241* (2013.01)

(58) Field of Classification Search
CPC .. H04W 4/024; H04W 52/0241; G08B 21/24; G08B 29/185
See application file for complete search history.

(56) References Cited

U.S. PATENT DOCUMENTS

| 6,225,906 B1 * | 5/2001 | Shore ................. G08B 21/0238 340/10.5 |
| 6,989,741 B2 * | 1/2006 | Kenny ............... G08B 13/1427 340/505 |

(Continued)

FOREIGN PATENT DOCUMENTS

| KR | 20120067871 A | 6/2012 |
| WO | 2007116211 A1 | 10/2007 |
| WO | 2014122076 A2 | 8/2014 |

OTHER PUBLICATIONS

Temperton: "New Indoor Tracking Tech Could Stalk Your Every Move"; Nov. 22, 2014 downloaded from http://www.wired.co.uk/news/archive/2014-11/22/new-technology-can-track-you-indoors, 6 Page Document.

(Continued)

*Primary Examiner* — Munear T Akki

(57) ABSTRACT

Thus there is provided an object retrieval apparatus for retrieving an object which has been lost which comprises a location module arranged to determine a location indication indicative of the location of the apparatus, a first body-coupled communication (BCC) device configured to establish a communication link with a second body-coupled communication device in a tag (3) attachable to the object, wherein the first BCC device is further configured to check the communication link at check times, the check times occurring at repeated intervals, and to generate a link status signal indicating whether the communication link is intact or not, a control module arranged to receive the link status signal, and, if the link status signal indicates a broken link, (Continued)

to set a flag, record the location as a loss recorded location and generate an alert.

13 Claims, 3 Drawing Sheets

(51) Int. Cl.
*G08B 21/24* (2006.01)
*H04W 52/02* (2009.01)

(56) References Cited

U.S. PATENT DOCUMENTS

| | | | |
|---|---|---|---|
| 7,342,497 B2* | 3/2008 | Chung | G06Q 10/08 |
| | | | 235/375 |
| 9,865,153 B2 | 1/2018 | Zhijian | |
| 2005/0116823 A1* | 6/2005 | Paulsen | G01S 5/06 |
| | | | 340/539.13 |
| 2007/0229350 A1* | 10/2007 | Scalisi | G08B 21/0247 |
| | | | 342/350 |
| 2008/0106399 A1 | 5/2008 | Yaqub et al. | |
| 2010/0188231 A1* | 7/2010 | Winter | A61B 90/90 |
| | | | 340/573.1 |
| 2011/0227856 A1 | 9/2011 | Corroy et al. | |
| 2012/0218103 A1 | 8/2012 | Alves et al. | |
| 2013/0151699 A1 | 6/2013 | Vock et al. | |
| 2013/0179692 A1* | 7/2013 | Tolba | H04L 63/0838 |
| | | | 713/179 |
| 2014/0135042 A1 | 5/2014 | Buchheim et al. | |
| 2014/0266755 A1 | 9/2014 | Arensmeier et al. | |
| 2014/0266756 A1 | 9/2014 | Young | |
| 2015/0372770 A1* | 12/2015 | Ouzounov | H04W 4/80 |
| | | | 455/41.2 |
| 2016/0063849 A1 | 3/2016 | Hasegawa et al. | |
| 2016/0174071 A1* | 6/2016 | Weast | H04B 13/005 |
| | | | 455/411 |
| 2016/0192112 A1 | 6/2016 | Sydir et al. | |

OTHER PUBLICATIONS

PCT/EP2018/069926 ISR & WO, dated Feb. 12, 2019, 30 Page Document.

* cited by examiner

SYSTEM AND METHOD FOR REGISTERING A POSITION OF LOSS OF AN OBJECT

CROSS-REFERENCE TO PRIOR APPLICATIONS

This application is the U.S. National Phase application under 35 U.S.C. § 371 of International Application No. PCT/EP2018/069926, filed on Jul. 23, 2018, which claims the benefit of European Patent Application No. 17182809.8, filed on Jul. 24, 2017. These applications are hereby incorporated by reference herein.

FIELD

The present invention relates to the locating of lost items, in particular those that may be carried about the person.

BACKGROUND

Losing small items like keys is a common problem and many people would like a good solution. This is also true for some of the smart medical patches and other things like badges. Elderly people in particular could find such a solution beneficial.

It has been proposed to attach a device or 'tag' to the item and have the device communicate with another device which is capable of determining location, such as a mobile phone. The proposed communication is via a known wireless technology such as Bluetooth™. The idea is that when the tag moves out of range of the wireless link, the phone will note the location so that when the user becomes aware of the loss, they can consult the phone to find the last location where the tag was linked to the phone.

The actual range of many 'short range' wireless technologies can be much greater than expected. In the example just given, the standard specifies a maximum range of 10 m which already means quite a wide area. However, in reality, in the absence of too much interference or obstructions such as walls, such a link can work up to distances such as 30 m. The consequence of this is the registered location and the actual location of loss may differ significantly and in an unpredictable manner. This can mean that finding the object may turn out to be more complicated than expected.

Furthermore, many examples of the above mentioned solutions require transmissions to a cloud-based system which records the locations where communications with the tag have occurred. This requires a mobile internet connection which may be costly and simply not available or reliable enough in many places.

Furthermore, is it also desirable that the tag consume very little power and so give a long battery-life.

Therefore, it is desirable to provide a system which registers the location of loss more accurately, the system being inexpensive to operate and consuming limited power.

SUMMARY

Thus there is provided an object retrieval apparatus for retrieving an object which has been lost which comprises a location module arranged to determine a location indication indicative of the location of the apparatus, a first body-coupled communication (BCC) device configured to establish a communication link with a second body-coupled communication device in a tag (3) attachable to the object, wherein the first BCC device is further configured to check the communication link at check times, the check times occurring at repeated intervals, and to generate a link status signal indicating whether the communication link is intact or not, a control module arranged to receive the link status signal, and, if the link status signal indicates a broken link, to set a flag, record the location as a loss recorded location and generate an alert. Other methods have a much longer range which translates into lower positional accuracy because the radius within which the tag is relative to the apparatus is larger. This system thus offers the advantage of being able to record more accurately where the object is lost than with other systems, particularly those using even short-range wireless links. The control module also has a location storage and is further arranged to record, in the location storage, the location as a last known present location if the link status signal indicates an intact link and record, in the location storage, a series of locations between check times and calculate a route between the loss recorded location and the last known present location using the series of locations, the route passing back through the series of locations. The object will mostly likely lie just off the actual route travelled. If the system were to simply indicate that the object has been lost and indicate where it was last known to be still present, there is a risk that the person takes another, shorter route back and misses the object. However this way, the person is more likely to pass where the object actually lies.

In an embodiment, the apparatus has the first body-coupled communication device initiate periodic communications with the second body-coupled communication device and determines the communications fail if no response is received within a time period. In this way the two BCC devices do not need to maintain the link which has the advantage of saving power as compared to a system where the link is checked continuously In an embodiment the first body-coupled communication device measures the body-coupled communication field with the second body-coupled communication device and determines a broken link if a change in the body-coupled communication field indicating that the second body-coupled communication device is no longer within communication range is detected. This permits using a very simple BCC device on the tag since it does not need any timer or logic to perform the wake-up's and responses.

In an embodiment the flag is set when a plurality of determinations of a broken link status has been made. By requiring multiple confirmations of a broken link, the situation where interference or other changes in the BCC field cause false alerts.

In an embodiment a first flag is set when the communications fail is determined according to claim 3 and wherein a second flag is set when a further communications fail is determined according to claim 4 and to generate the alert if both first and second flags have been set. Here the link is checked by both field measurement and polling which offers even greater confidence that the broken link status is genuine.

In an embodiment the noticeability of the alert notification is set at a higher level if it detected that the apparatus is moving from an indoor location to an outdoor location. Since the risk of permanent loss is greater in outdoor locations because these may have more things to hide the object and, perhaps more importantly, the person may start to travel much quicker (in a vehicle for example), this useful for attracting the person's attention earlier. Also outdoors are often noisier.

There is also provided a tag for the retrieval an object which has been lost, the tag being configured to be attached to the object and comprising a second body-coupled communication device configured to communicate with a first body-coupled communication device in an object retrieval apparatus as described herein. This tag, when uses with the apparatus, helps reduce the risk of permanent loss of the object. The tag also comprises an acceleration sensor arranged to cause the sending of a message via the second body-coupled communication device (5) to the object retrieval apparatus if an acceleration greater than a threshold is detected. This has the advantage of allowing the system to react quicker and so make a more accurate determination of the position of loss by causing the object retrieval apparatus to make a location measurement, rather than waiting to the next scheduled time.

In an embodiment the tag further comprising a wake-up timer arranged to set the tag in alternate wake and sleep modes and to initiate a body-coupled communication with the object retrieval system each time the wake mode is entered. This allows the tag to save battery power during sleep periods.

There is also provided a method of retrieving an object comprising providing an apparatus comprising a body-coupled communication device and establishing a communication link with another BCC device attached to the object, providing a location unit, arranged to measure a location of the apparatus, checking, at a check time which occurs at repeated intervals, by use of the BCC devices whether the communication link is intact or not, if the communication link is found to be broken, setting a link broken status and measuring the location as a loss recorded location, generating an alert signal if the link broken status is set, and calculating a route between the loss recorded location and the last known present location. Other methods have a much longer range which translates into lower positional accuracy because the radius within which the tag is relative to the apparatus is larger. This system thus may be able to record more accurately where the object is lost than with other systems, particularly those using even short-range wireless links. The method further comprises that if the communication link is found to intact, measuring the location and recording this as a last known present location and recording a series of locations between check times and calculating a route which passes through the series of locations.

The object will mostly likely lie just off the actual route travelled. If the method resulted simply in an indication that the object has been lost and where it was last known to be still present, there would be a risk that the person takes another, shorter route back and misses the object. However this way, the person is more likely to pass where the object actually lies.

In an embodiment the checking of the communication link is achieved by the first body-coupled communication device initiating periodic communications with the second body-coupled communication device and determines the communication fail if no response is received within a timeout period.

In an embodiment, the checking of the communication link is achieved by the first body-coupled communication device measuring a field strength of the communication link.

In an embodiment, the method further comprises, if the communication link is found to be broken, setting a first flag and checking the communication link again and, if the communication link is again found to be broken, setting a second flag and generating the alert.

There is also provided a computer software product, stored on a computer readable medium, and arranged, when caused to run on a computer processing device, to execute the method described herein. Such a product could be loaded onto a portable computing device such as a phone which is also equipped with a suitable configured body-coupled communication device.

BRIEF DESCRIPTION OF THE DRAWINGS

The above, as well as additional objects, features and advantages of the disclosed devices, systems and methods, will be better understood through the following illustrative and non-limiting detailed description of embodiments of devices and methods, with reference to the appended drawings, in which.

DETAILED DESCRIPTION OF EMBODIMENTS

In the following description, same references designate like elements.

Figure 1:
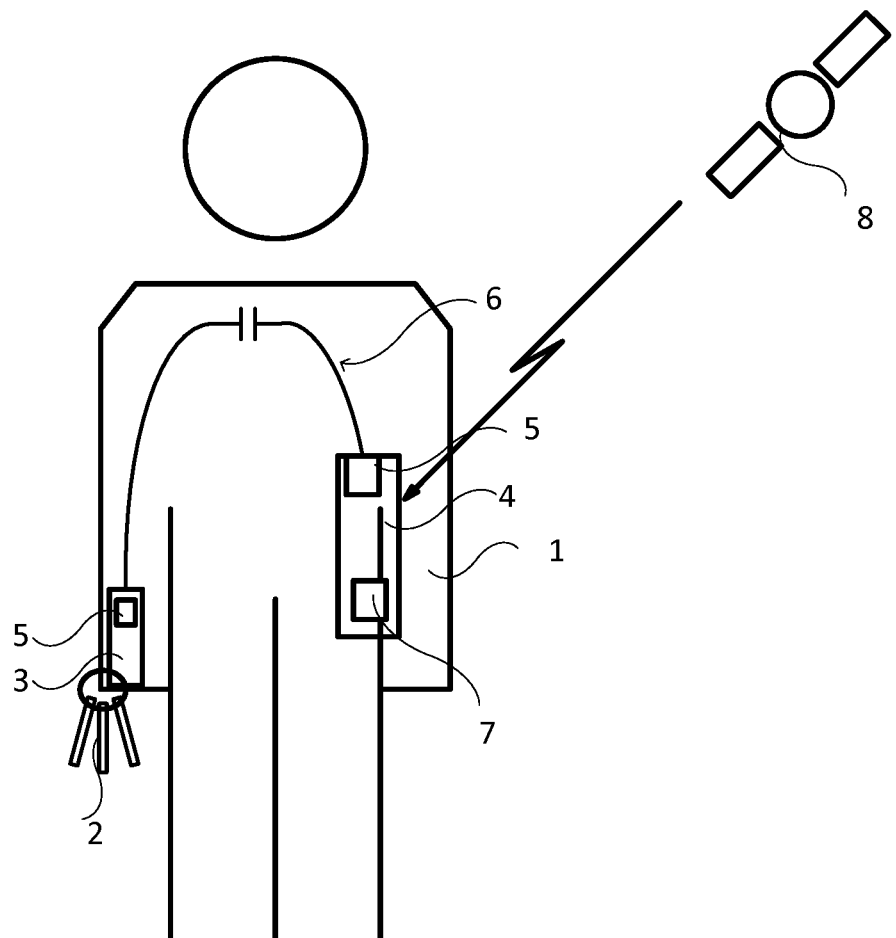
FIG. 1 represents a situation where a person is equipped with an object retrieval apparatus and an object having a tag, these being according to an embodiment.

FIG. 1 represents a situation where an object retrieval system according to an embodiment is employed. A person or user 1 carries an object 2, the object 2 being equipped with a tag 3 (i.e. small object which can be attached). The example given here of the object 2 is a set of keys but many other items could be envisaged such as, without limitation, wallets, purses or identity badges. The person also carries an object retrieval apparatus 4, the object retrieval apparatus 4. Both the tag 3 and the object retrieval apparatus 4 are equipped with body-coupled communication (BCC) devices 5. The two BCC devices 5 are configured to establish a link 6 using BCC field between them. The two BCC devices 5 may be functionally identical or one, particularly the one in the object retrieval apparatus 4, may have additional functionality. Additionally the object retrieval apparatus incorporates a location unit 7. The location unit 7 may include a satellite-based system such as GPS, GLONASS and GALLILEO and receive signals from a satelline 8.

Figure 2:
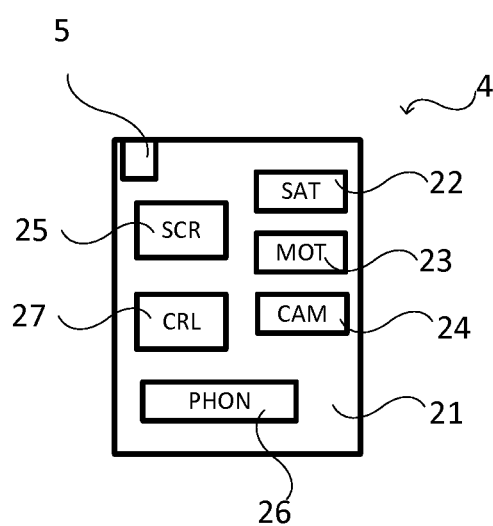
FIG. 2 represents an object retrieval apparatus according to an embodiment.

FIG. 2 represents an embodiment of the object retrieval apparatus 4. Inside a housing 21 there are located a satellite navigation device (SAT) 22 for receiving the signals from the, a motions sensor (MOT) 23 arranged to detect and measure movements of the apparatus 4, a optional camera (CAM) 24, a screen (SCR) 25 and a cellular phone modem (PHON) 26. Together the satellite navigations system 22 and motion sensor 23 form the basis of the location unit 7. Whilst the aforemention configuration has many advantages, a low-cost embodiment could be realised by retaining only the BCC device 5 and the motion sensor 23. Finally there is a control function or module (CRL) 27 which is arranged to control the BCC device 5, the motion sensor 24 and, where present, the satellite navigation device 22. This may be implemented as part of the control of the overall apparatus 4. A convenient implementation of the control device 27 could a processor or software running thereon and could as part of functionality of the processor of the mobile phone in the case where the object retrieval apparatus is implemented in a mobile phone. Associating the control device with a memory in the apparatus for storage and retrieval of information would also be very convenient.

Body-coupled communications (BCC) or body-based communication has been proposed as an alternative to radio frequency (RF) communication for instance as a basis for body area networks (BANs); An example is the standard by the 802.15.6 Task Group of the Institute of Electrical and Electronics Engineers (IEEE). BCC allows exchange of information between a plurality of devices which are at or in close proximity of a body of a human or an animal. This can be achieved by capacitive or galvanic coupling of low-energy electric or electrostatic fields onto the body surface. This coupling may be achieved by the use of pairs of appropriately designed plates position on or close to the body surface.

In capacitive body coupled communication (BCC) systems information is transmitted from a transmission device to a receiver device via capacitive coupled signals over the user's body. Body coupled communication utilizes an electrostatic field rather than an electromagnetic field to transmit information. Capacitive coupling the signal from a small body-worn tag into the body, it generates a minute yet detectable electric or electrostatic field that extends outwardly a couple of centimeters from the entire surface of the skin. This is a convenient choice for the field supporting the BCC because it is easy to establish on a relatively low-conductivity object such as a human body and can be maintained at low power levels.

Body coupled communication (BCC) uses the human body as communication channel. It enables wireless communication over a human body between devices that are in contact with that human body. Signals are conveyed over the body instead of through the air. As such, the communication is confined to an area close to the person's 1 body, or at least to very short distances around it.

For links between portable objects, RF or wireless communications are the standard choice. In fact, RF communication technologies typically strive to provide the greatest range for the given power level and frequency band in order to make a reliable communication link. However, it turns out that this works against the desired result in this case and, contrary to typical design choices, BCC offers advantages. This is because the range of communication determines the separation between person 1 and object 2 that is needed for the system in question to judge that a loss has occurred. For example, technologies like Bluetooth™ have a 10 m range on paper but in fact can reach 30 m in open environments. BCC, on the other hand is constrained to the size of the person 1. Therefore a loss will be determined with BCC in a significantly smaller radius than with a longer range technology.

Figure 3:
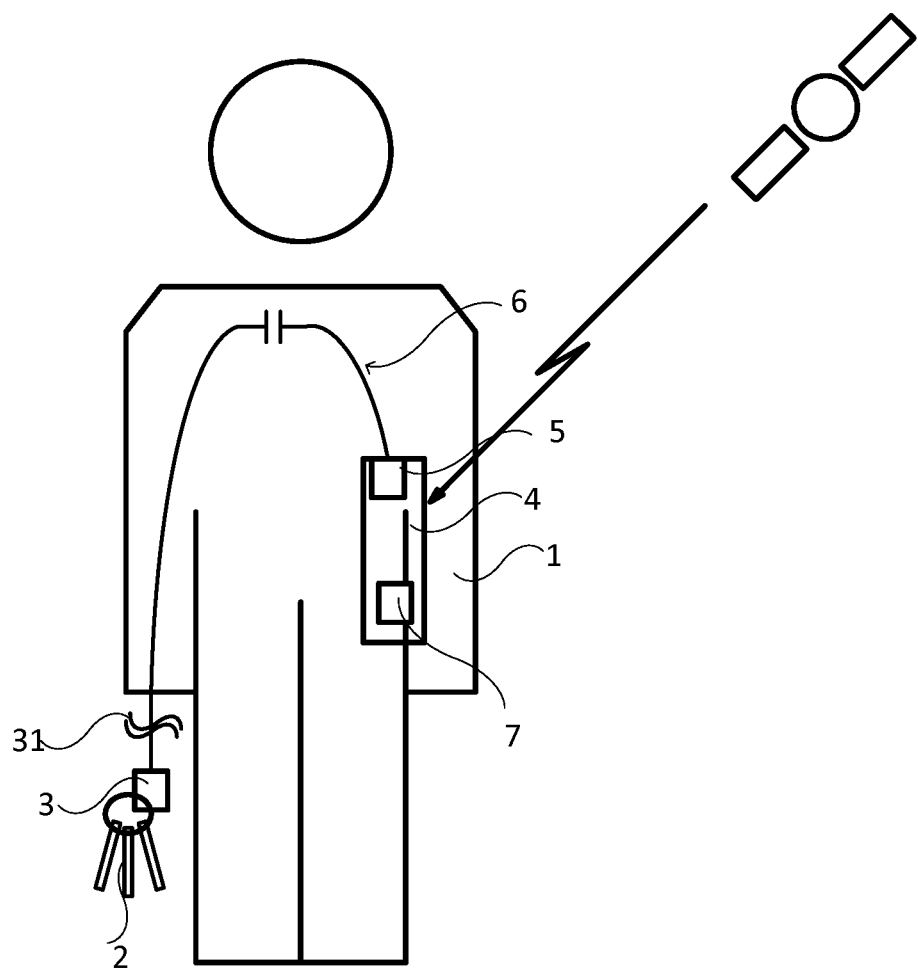
FIG. 3 represents a situation of FIG. 1 where the object and tag has become distanced from the person.

FIG. 3 represents an evolution of the situation of FIG. 1 where the object 2 has become separated from the person 1. The consequence of this is that BCC field supporting the link 6 has become significantly attenuated. This attenuation here is represented as an interruption or break 31 in the link 6. However those skilled in the art will understand that an interruption 31 corresponds to a situation where the BCC field is either too small to be detected or too weak for communications via it to be possible. The respective BCC devices 5 are configured to detect this break 31 and generate an alert signal accordingly which may be fed to the control module 27. The control module may then acquire the location using the location unit 7 and note this location as the location where the loss was recorded.

Thus the object retrieval apparatus for retrieving an object 2 which has been lost comprises a location module 7 arranged to determine a location indication indicative of the location of the apparatus 4, a first body-coupled communication (or BCC for short) device 5 configured to establish a communication link with a second body-coupled communication device 5 in a tag 3, the tag being attachable to the object 2, wherein the first BCC device is further configured to check the communication link (6) at check times, the check times occurring at repeated intervals, and to generate a link status signal indicating whether the communication link is intact or not, and a control module arranged to receive the link status signal, and if the link status signal indicates a broken link, to set a flag, record the location as a loss recorded location and generate an alert. The location module 7 comprises a motion sensor 23 and/or satellite navigation device 22. This system thus may be able to record more accurately where the object is lost compared to other systems, particularly those using even short-range wireless links.

Optionally if the link status signal indicates an intact link, the first BCC device is configured to record the location as a last known present location.

Figure 4:
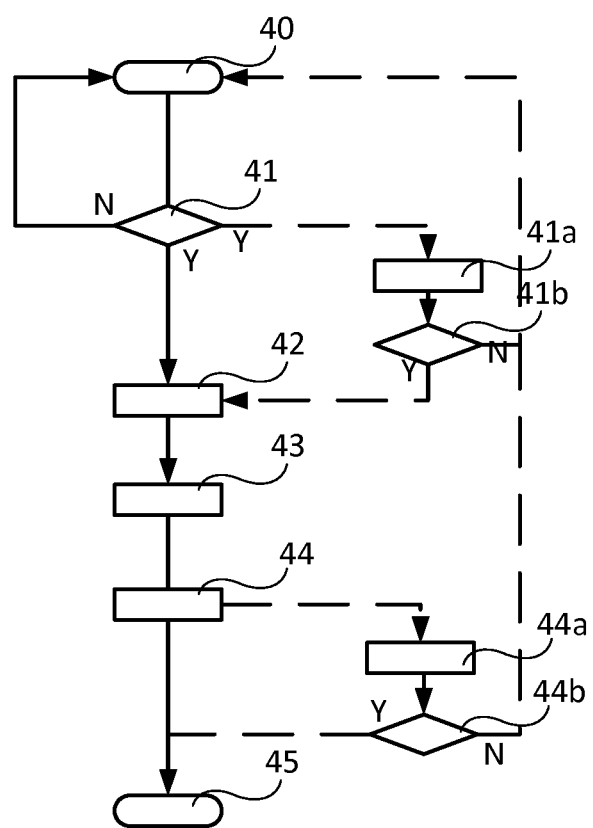
FIG. 4 represents a flow of a method according to an embodiment.

FIG. 4 represents a flow or method according to an embodiment. At step 40, a first BCC device 5 in an object retrieval apparatus 4 checks the status of a BCC link 6 to a second BCC device in the tag 3 attached to an object 2. If, at step 41 the first BCC device 5 concludes that the link 6 is intact ("N"), it obtains the current location from the location unit 7 and records it as the last known present location and returns to either measuring and storing locations until the next occasion for checking at step 40. If, however, it concludes that the link 6 is broken ("Y"), the flow passes to step 42 where the alert status is generated. The flow then passes to step 43 where the control module 27 acquires the current location of the object retrieval apparatus 4 and records it as a loss recorded location.

In an embodiment, the object retrieval apparatus 4 makes a series of periodic records of locations and/or movements undergone by the object retrieval apparatus 4 using the location unit 7. This series of records could be started each time the object retrieval apparatus has performed the check of step 40 and concluded that the link 6 is intact. If the next check 40 results in a conclusion that the connection is intact, the series of records is erased or reset and recording starts again. However if the conclusion is that the link 6 is broken, the control module 27 may note the current location as the 'loss recorded location' and, using the series of records of movements or locations, calculate a route back to the last known location where the connection was intact i.e. the first recorded location of the series. The object 2 should lie somewhere along this route. Alternatively, the series of records could be more permanent and each record could have an accompanying flag indicating that the check was positive (i.e. the BCC link 6 was intact) or negative (link 6 broken). Thus the apparatus 4 has a control module is further arranged to record a series of locations and calculate a route between the loss recorded location and the last known present location using the series of locations. The embodiment where the record is overwritten may require less storage space. Storing the locations in a memory in the apparatus, i.e. internally, has the advantage that access to remote storage is not needed—for example cloud storage and a cell phone would need the use of the cell network, which consumes more power and may incur a cost.

Thus, in an embodiment, the control module of the retrieval apparatus 4 is further arranged to record the location as a last known present location if the link status signal indicates an intact link and record a series of locations between check times and calculate a route between the loss recorded location and the last known present location using the series of locations, the route passing back through the series of location, rather than going via a shortest route, so that the person could 'retrace their steps' and have a better chance of finding the object 3—since the object may not lie exactly on the last known present location but some small distance from it. This is in contrast to most navigation systems which use intermediate locations merely to deduce one location from movements or changes from another known location. The motion sensor 23 may be useful in that the satellite navigation device 22 may have problems to operate indoors, where satellite reception is more difficult.

Given that BCC has a very short range, the distance between the last known present location and the actual location—the 'location accuracy'—is then determined by the interval between check times and the speed the person is travelling hence the distance they travel between check times. If this is made sufficiently short, location accuracies of within 5 m are achievable. For example a person walking swiftly may reach speeds of 5 km/h. This equates to 1.38 m/s so check time intervals of around 1 s should achieve well within the 5 m radius. Indeed, the location accuracy for a person cycling at a typical 20 m/s would still be close to 5 m. Therefore, much higher location accuracies are achievable with BCC than with conventional methods and systems. If it is desired to operate the system at higher speeds whilst retaining the positional accuracy, then it is clear that the check time period would need to be further reduced. However it should be noted that people travelling above certain speeds are most probably in enclosed vehicles which means that they are much less likely to increase their distance from the object over time.

The checking 40 may take the form of measuring the strength of the BCC field and this may be performed continuously or periodically. Alternatively the first BCC device 5 in the object retrieval apparatus may attempt periodically to contact the second BCC device 5 and wait for a response for a chosen time period. This is sometimes referred to a polling and the absence of a response within the chosen time period may be taken to indicate a break in the link 6. Where polling is used, it would be useful to have a sleep mode for the tag 3. In this case the tag would wake periodically (with a time period shorter than the chosen time period) or have only part of the tag 3 awake to listen for polling. The wake period of the tag 3 would have to be longer than the polling interval so that the tag 3 would be guaranteed to receive at least one poll. It should be understood that listening (receiving) requires significantly less power than replying (transmitting). Polling would require the wakeup and polling detection and response logic which may make the tag more expensive relative to a tag 3 configured for use with the field measurement technique. This would also consume power. Also the tag 3 does not have to make replies whereas with polling alone, it would have to make many 'unnecessary' replies and so use power for these. Low cost is highly desirable for the tag, as is consuming less power since it is desirable that this run for long periods on a small battery. Polling could be made to consume less power for the object retrieval apparatus 4 (since it will need a more complicated BCC device 5 anyway and polling allows this to be powered down when not in use). If it is intended that there be multiple objects 2 to be keep track of, a single poll for all objects could be used. This is desirable since this apparatus 4 will often implemented in a mobile phone which often has many demands on its battery. Another advantage of polling with multiple tags is that the object retrieval apparatus will be able to tell more easily which tag is missing and so identify it to the person 1. Another advantage of polling is that setting the criterion by which a broken link is judged may be easier (absence of response within a certain time) than with the field measurement technique where a threshold will be needed. Also, with the field measurement technique, the presence of one intact link may obscure problems with another.

Another possibility with a tag 3 arranged to wake and sleep is that upon waking it initiates the communication with the object retrieval apparatus 4. Thus a compromise between saving power in the tag 3 and in the object retrieval apparatus 4 will need to be made and this is within the reach of the skilled person. Another advantage of polling is that it is less susceptible to changes in the BCC field resulting from changes in the environment of the person and other forms of interference.

Thus the method of retrieving an object comprises providing an apparatus 4 comprising a body-coupled communication device (BCC) 5 and establishing a communication link 6 with another BCC device 5 attached to the object 2, providing a location unit, arranged to measure a location of the apparatus, checking, at a check time which occurs at repeated intervals, by use of the BCC devices 5 whether the communication link 6 is intact or not, if the communication link 6 is found to intact, measuring the location and recording this as a last known present location, if the communication link 6 is found to be broken, setting a link broken status and measuring the location as a loss recorded location, generating an alert signal if the link broken status is set, and calculating a route between the loss recorded location and the last known present location.

In an another embodiment, upon a link broken status, a first flag is set and the flow rather passes from step 41 a second check of the link 6 at step 41a and a second decision step 41b. If at this second decision step 41b, the control device 27 concludes that link 6 is intact, the first flag is reset and the flow passes back to step 40. Conversely, if the conclusion is that the link 6 is broken, then then a second flag is set, again indicating a link broken status, and flow passes to step 42. In this case, the alert signal would be generated only after the second. An implementation of this could be to measure the BCC field strength at step 40 and use polling at step 41b, This way less power is required for measurement by the tag 3. Alternatively, polling could be used as the default method i.e. up until a first boken link status is determined at step 40. Then measuring the BCC field strength could be used at step 41a. This setup could save power in the object retrieval apparatus 4 for most of the time and then economise the power used by the tag 3 where repeat measurements are needed in close succession.

At step 43 the receipt of the status signal indicating a broken link 6 ('broken link status'), the control module or device 27 sets a flag (i.e. notes the status internally), obtains the location from the location unit 7 and records this location as the loss recorded location. Then at step 44, the control module 27 computes a route between the loss recorded location and the last known present location. At step 45, the control module 27 generates an alert notification and a presentation of the route it has computed to the user. An optional last verification of the link status and a decision to continue or return to step 40 may be made at steps 44a and 44b respectively.

The advantage of performing multiple checks before actually generating the notification is that it avoids generating false alerts caused be variations in the BCC field or interruptions in the communications resulting from interference.

The time taken to complete the method should be less than the desired check time interval. Also the actual time needed to perform each check may be implementation-dependent. Therefore the skilled person may have to make a trade-off between location accuracy, on the one hand, and the preferred technique of checking the link status and the time the method requires on the other.

Thus the control module 27 is configured to generate the alert notification under the control of a flag, the a flag being set upon a determination of a broken link status.

The flag may also therefore be set when two or more determinations, i.e. a plurality, of a broken link statuses have been made.

The alert notification could be any of an audible alert (such as a loud noise or even spoken warning), a vibration motion by the retrieval device and some visual alert such as a flashing message, or some combination thereof In the case where the person is elderly and is subscribed to a monitoring system, an alert could be also sent (for example by an SMS message) to a monitoring centre or carer to inform them that the person in question has lost something important like their keys. Optionally, where the tag 3 has some processing power, it too could generate an alert such as a noise or a light.

Because of the general difficulty of using the satellite navigation module 22 indoors (because of the issues with satellite reception), the control module 27 can be configured to determine whether the retrieval apparatus 4 is in an indoor location or an outdoor location. This may be used to enable indoor location determination using a combination of data from the motion sensor, and/or the last known location from the satellite navigation and In an embodiment, the noticeability of the alert notification is set at a higher level if it detected that the apparatus is moving from an indoor location to an outdoor location. In many situations, when a person moves from indoor to outdoor, they then leave the general area and become further away much faster (in a car, for example), making the risk of permanent loss greater—they may, for example, find it harder to retrace their steps. Also, outdoors are often noisier than indoors so the person may not notice an audible alert. Thus the twofold advantage of this is that this can avoid the person leaving the location loss at too greater speed and/or not noticing the alert.

Optionally, the tag 3 may be equipped with a motion sensor arranged to detect falling of the object i.e. that it is in the process of being dropped. The motion sensor can be arranged to send a message via the BCC link 6 if acceleration above a threshold is detected, waking the tag 3 if necessary (because sleeping to save battery power has been implemented). Upon receipt of the message, the retrieval apparatus 4 makes an immediate determination of the location. This may allow the system to make a more accurate determination of the loss location in that otherwise the system would wait until the next location measurement was due. Instead, the message could be used to set the first flag at step 41 of FIG. 4. Then the routine could pass to step 41a as described before, where the check of the link status could be made using either or both of polling or measuring the BCC field. Whilst the message could be used to generate an immediate alert, this might result in false alarms—for example where the person jumps or starts running Therefore, it could be preferable to use the message as described i.e. to improve the accuracy of the location determination and in the determination of a link broken status. Since the acceleration due to gravity is 9.8 ms$^{-2}$, a threshold may be set in the region of 7 to 8 ms$^{-2}$ in order to classify the acceleration as being due to falling.

The various features of the embodiments may be implemented in different combinations.

Aspects of the embodiments may be implemented in a computer program product, which may be a collection of computer program instructions stored on a computer readable storage device which may be executed by a computer. The instructions may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. An object retrieval apparatus for retrieving data from an object which has been lost comprising:
   a location module arranged to determine a location indication indicative of the location of the apparatus;
   a first body-coupled communication (BCC) device configured to establish a communication link with a second body-coupled communication device in a tag attachable to the object, wherein the first BCC device is further configured to check the communication link at check times, the check times occurring at repeated intervals, and to generate a link status signal indicating whether the communication link is intact or not;
   a control module arranged to receive the link status signal, and, if the link status signal indicates a broken link, to set a flag, record the location as a loss recorded location and generate an alert;
   a location storage;
   wherein the control module is further arranged to record, in the location storage, the location as a last known present location if the link status signal indicates an intact link and record, in the location storage, a series of locations between check times and calculate a route between the loss recorded location and the last known present location using the series of locations, the route passing back through the series of locations.

2. The apparatus of claim 1 wherein the first body-coupled communication device initiates periodic communications with the second body-coupled communication device and determines a communications fail if no response is received within a time period.

3. The apparatus of claim 2, wherein the first body-coupled communication device measures the body-coupled communication field with the second body-coupled communication device and determines a further communications fail if a change in the body-coupled communication field indicating that the second body-coupled communication device is no longer within communication range is detected.

4. The apparatus of claim 1, wherein the flag is set when a plurality of determinations of a broken link status has been made.

5. The apparatus of claim 2,
wherein a first flag is set when the communications fail is determined, and
wherein the first body-coupled communication device measures the body-coupled communication field with the second body-coupled communication device and determines a further communications fail if a change in the body-coupled communication field indicating that the second body-coupled communication device is no longer within communication range is detected, and
wherein a second flag is set when the further communications fail is determined, and to generate the alert if both first and second flags have been set.

6. The apparatus of claim 1 wherein the noticeability of the alert notification is set at a higher level if it detected that the apparatus is moving from an indoor location to an outdoor location.

7. A tag for the retrieval an object which has been lost, the tag being configured to be attached to the object and comprising
a second body-coupled communication (BCC) device configured to communicate with an object retrieval apparatus; and
an acceleration sensor arranged to cause the sending of a message via the second BCC device to the object retrieval apparatus if an acceleration greater than a threshold is detected, wherein the object retrieval apparatus comprises:
a location module arranged to determine a location indication indicative of the location of the apparatus;
a first BCC device configured to establish a communication link with the tag and check the communication link at check times, the check times occurring at repeated intervals, and to generate a link status signal indicating whether the communication link is intact or not;
a control module arranged to receive the link status signal, and, if the link status signal indicates a broken link, to set a flag, record the location as a loss recorded location and generate an alert;
a location storage;
wherein the control module is further arranged to record, in the location storage, the location as a last known present location if the link status signal indicates an intact link and record, in the location storage, a series of locations between check times and calculate a route between the loss recorded location and the last known present location using the series of locations, the route passing back through the series of locations.

8. The tag of claim 7 further comprising a wake-up timer arranged to set the tag in alternate wake and sleep modes and to initiate a body-coupled communication with the object retrieval system each time the wake mode is entered.

9. A method of aiding in retrieving data from an object comprising:
providing an apparatus comprising a body-coupled communication device (BCC) and establishing a communication link with another BCC device attached to the object;
providing a location unit, arranged to measure a location of the apparatus;
checking, at a check time which occurs at repeated intervals, by use of the BCC devices whether the communication link is intact or not;
if the communication link is found to be intact, measuring the location and recording this as a last known present location;
if the communication link is found to be broken, setting a link broken status and measuring the location as a loss recorded location;
recording, by the apparatus, a series of locations between check times;
generating, by the apparatus, an alert signal if the link broken status is set, and
calculating, by the apparatus, a route between the loss recorded location and the last known present location which passes through the series of locations.

10. The method of claim 9 wherein the checking of the communication link is achieved by the first body-coupled communication device initiating periodic communications with the second body-coupled communication device and determines the communication fail if no response is received within a timeout period.

11. The method of claim 9, wherein the checking of the communication link is achieved by the first body-coupled communication device measuring a field strength of the communication link.

12. The method of claim 9 further comprising, if the communication link is found to be broken, setting, by the apparatus, a first flag and checking the communication link again and, if the communication link is again found to be broken, setting, by the apparatus, a second flag and generating the alert.

13. A non-transitory computer-readable medium that when run on a computer processing device, causes the device to perform a the method of aiding in retrieval data from an object, the method comprising:
providing an apparatus comprising a body-coupled communication device (BCC) and establishing a communication link with another BCC device attached to the object;
providing a location unit, arranged to measure a location of the apparatus;
checking, at a check time which occurs at repeated intervals, by use of the BCC devices whether the communication link is intact or not;
if the communication link is found to be intact, measuring the location and recording this as a last known present location;
if the communication link is found to be broken, setting a link broken status and measuring the location as a loss recorded location;
recording, by the apparatus, a series of locations between check times;
generating, by the apparatus, an alert signal if the link broken status is set, and
calculating, by the apparatus, a route between the loss recorded location and the last known present location which passes through the series of locations.

* * * * *